(12) United States Patent
Cortenraad et al.

(10) Patent No.: US 7,675,238 B2
(45) Date of Patent: Mar. 9, 2010

(54) LIGHTING DEVICE WITH USER INTERFACE FOR LIGHT CONTROL

(75) Inventors: Hubertus Maria Rene Cortenraad, Eindhoven (NL); Elmo Marcus Attila Diederiks, Eindhoven (NL); Anthonie Hendrik Bergman, Eindhoven (NL); Martijn Adrianus Bernardus Santbergen, Amsterdam (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 685 days.

(21) Appl. No.: 11/568,626

(22) PCT Filed: Apr. 27, 2005

(86) PCT No.: PCT/IB2005/051376

§ 371 (c)(1),
(2), (4) Date: Nov. 3, 2006

(87) PCT Pub. No.: WO2005/107337

PCT Pub. Date: Nov. 10, 2005

(65) Prior Publication Data

US 2008/0284348 A1 Nov. 20, 2008

(30) Foreign Application Priority Data

May 5, 2004 (EP) .................................. 04101935

(51) Int. Cl.
*H05B 37/02* (2006.01)

(52) U.S. Cl. .................... 315/157; 315/155; 315/291; 315/324

(58) Field of Classification Search ................. 315/149, 315/152, 155–156, 291, 299, 307, 312, 316, 315/324; 362/227, 233, 276, 529, 800
See application file for complete search history.

(56) References Cited

U.S. PATENT DOCUMENTS

| 6,967,448 | B2 * | 11/2005 | Morgan et al. | ............... 315/295 |
| 7,202,613 | B2 * | 4/2007 | Morgan et al. | ............... 315/312 |
| 2002/0067144 | A1 | 6/2002 | Hoffknecht et al. | |
| 2002/0171365 | A1 * | 11/2002 | Morgan et al. | ................. 315/56 |

(Continued)

FOREIGN PATENT DOCUMENTS

DE 10119648 A1 10/2002

(Continued)

OTHER PUBLICATIONS

Fitzmaurice G. W. et al: Association for Computing Machinery; Brick Laying the Foundations for Graspable User Interfaces, May 1995, pp. 442-449, XP000538473.

*Primary Examiner*—David Hung Vu
*Assistant Examiner*—Tung X Le

(57) ABSTRACT

The present invention relates to a lighting system (1) with a user interface (3) for controlling the lighting color and/or intensity of a lighting unit (2) determining the lighting conditions in a room. The user interface (3) is based on a system comprising a detection device (4) and transponders (6). Bringing the transponders (6) within the detection device (4) so that they will be detected causes the transponders (6) to send a response signal, which signal controls the lighting color and/or intensity of the lighting unit (2). Each transponder (6) is programmed to control a particular color or a specific light intensity.

17 Claims, 3 Drawing Sheets

U.S. PATENT DOCUMENTS

Figure 2A:
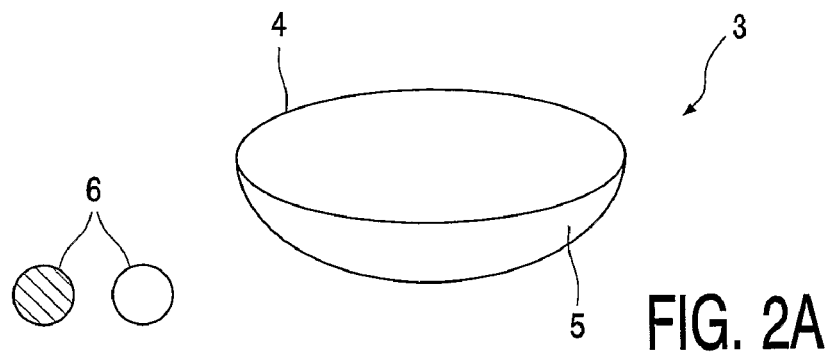
Figure 2B:
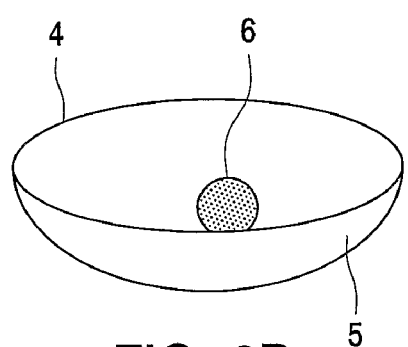
Figure 2C:
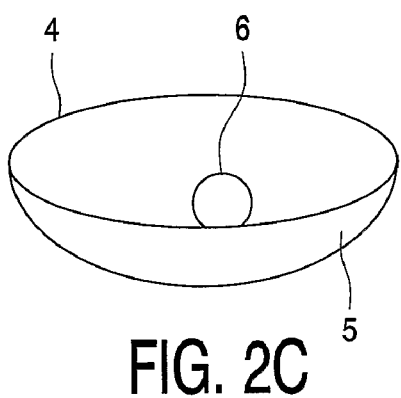

| | | |
|---|---|---|
| 2004/0051393 A1 | 3/2004 | Ratcliffe |
| 2004/0141321 A1* | 7/2004 | Dowling et al. .............. 362/276 |
| 2004/0160199 A1* | 8/2004 | Morgan et al. .............. 315/312 |
| 2004/0257007 A1* | 12/2004 | Lys et al. .................... 315/294 |
| 2005/0116667 A1* | 6/2005 | Mueller et al. .............. 315/312 |
| 2005/0225427 A1* | 10/2005 | Bell et al. .................... 340/5.2 |
| 2006/0262516 A9* | 11/2006 | Dowling et al. ............. 362/101 |

FOREIGN PATENT DOCUMENTS

| | | |
|---|---|---|
| JP | 2002319497 A | 10/2002 |
| WO | 2002-072840 A1 | 8/2004 |

\* cited by examiner

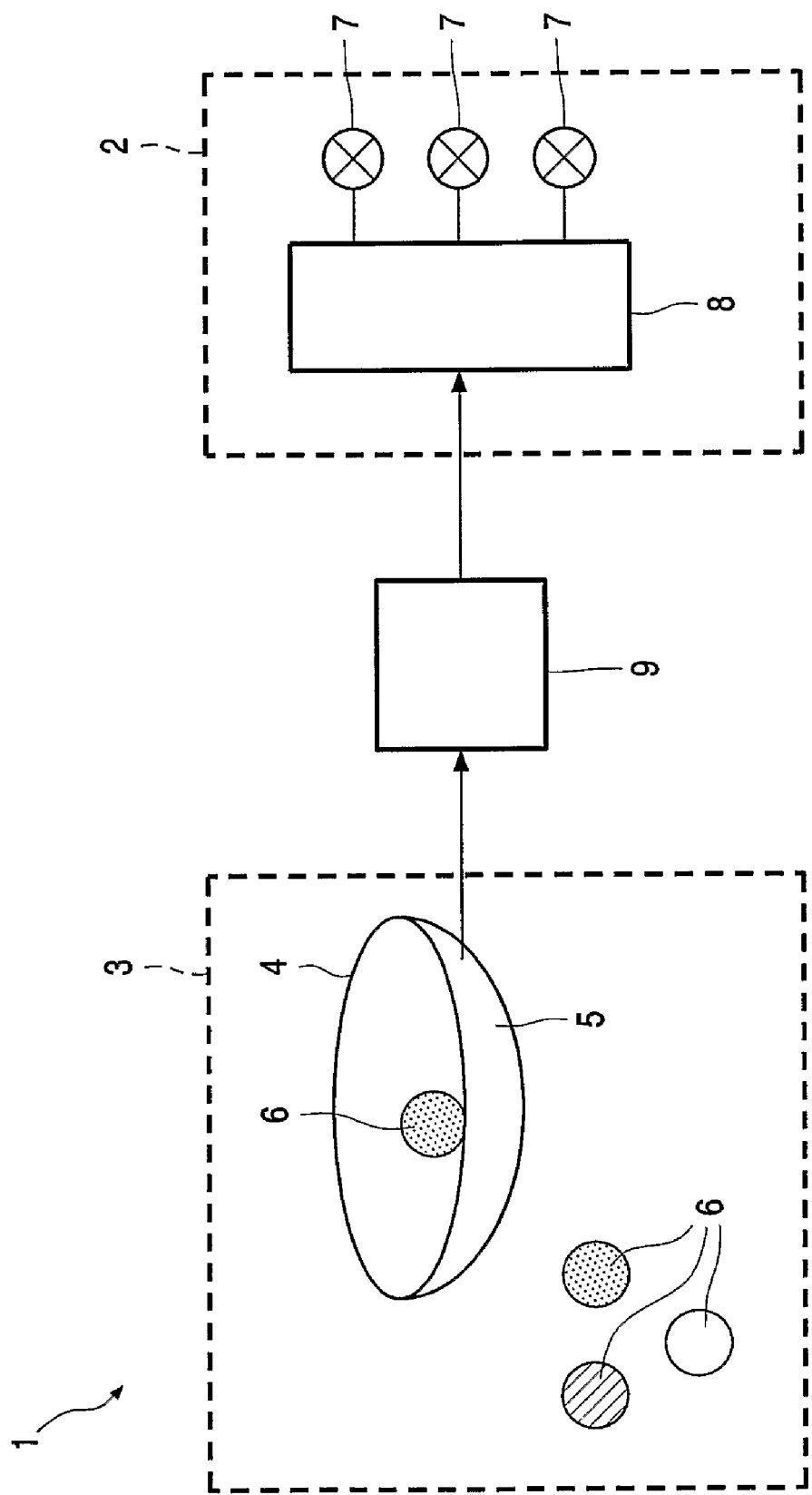

LIGHTING DEVICE WITH USER INTERFACE FOR LIGHT CONTROL

The invention relates to a lighting device comprising a lighting unit and an interface for controlling the lighting color and/or intensity of the lighting unit.

The invention further relates to a user interface for controlling a lighting device, to an assembly of a lighting unit and a processing unit controlled by such a user interface, and to a method of controlling a lighting device.

Present-day light sources mainly contain only one lighting color and these light sources can be controlled by switching them on or off or by dimming. In the near future light sources which are capable of producing a whole spectrum of colored light will become commonplace, also in every household. Such light sources will enable the creation of almost any color and atmosphere, depending on the room or place to be lit.

As a consequence, the control of such light sources will become more complex, because besides the light intensity or brightness, also the color aspects have to be controlled. Since the change of lighting color will be new to many people, it is of importance that such a control unit is easy to use.

It is a disadvantage of the prior art technology that it does not provide an easy method of controlling light sources with a wide spectrum.

It is an object of the present invention to provide a lighting device which can be controlled in an easy and intuitive manner.

According to the present invention, this object is realized by a lighting device comprising a lighting unit and a user interface for controlling the lighting color and/or intensity of the lighting unit, said user interface having a plurality of transponders and a detection device for detecting transponders, each transponder being arranged to control a particular lighting color and/or intensity and to assume a first position corresponding to a state in which said transponder is not detected by the detecting device, and a second position corresponding to a state in which said transponder is detected by the detection device and sends a response signal, said response signal controlling the lighting color and/or intensity of the lighting unit.

The invention is based on the recognition that by moving tangible objects—here referred to as transponders—with respect to a detection device for these objects it will become very easy for a user to change the color or the intensity of a light source, especially if each transponder corresponds to a particular color. For instance, if a user wants to change the intensity of a certain color, the only thing he needs to do is to change a transponder corresponding to that color from one position to another position. This movement of the transponder will cause the transponder to change its response signal, and this response signal is a measure for the change in lighting color.

In a preferred embodiment, the particular lighting colors to be controlled comprise the primary colors red, green, and blue.

In the 1931-CIE-chromaticity diagram, these primary colors will form a triangle and all the colors within this triangle can be generated by adjustment of the ratio of the intensities of the three relevant primary light sources. In particular, this enables the choice of a wide range of color temperatures of white light, from cold light—like the light of halogen-type lamps—to warm light—like the light of conventional light bulbs.

This is applicable to all kinds of light sources. Examples are incandescent lamps, light emitting diodes (LEDs); but the invention is not restricted to these examples.

A further embodiment is characterized in that the intensity of a lighting color is proportional to the number of transponders arranged to control said color and assuming the second position.

The arrangement of this embodiment is very favorable for achieving an intuitive control of a lighting device. The more transponders are put in their second position, the more light output is generated of that specific color. The relation between the number of transponders may, for instance, be chosen linearly, i.e. the power is linearly proportional to the number of transponders. Another option is to create an exponential relationship between the number of transponders in the second position and the power fed to the lighting unit; this conforms better to the perceptive aspects of the human eye.

In a further preferred embodiment, the transponders are RFID tags, each comprising an identification number, and the detection device comprises an antenna arranged to send, in operation, an electromagnetic signal which will be received by the RFID tag, the response signal comprising the identification number of the RFID tag.

It is preferred to choose Radio Frequency Identification tags (RFID tags) for the transponders. These tags are generally known and widely used, for instance in security systems for shops in order to prevent theft. Such an RFID tag when brought from its first position—in which it is not detected by the detection device—into its second position—in which it is detected by the detection device—will send its identification number or ID number as a response signal. This ID number can be coupled in a unique way to a change in color or intensity, for instance by means of a look-up table.

It will also be possible to couple ID numbers of transponders to change the light intensity proportionally with the already adjusted color, so in a color-neutral way. Furthermore, it will be possible to use 'white' RFID-tags, which change the intensity by adding a certain amount of white light to the lighting unit; in most cases this will change the color of the light. In order to make it comfortable to adjust such a lighting device, the transponders may be given the respective colors they control. Thus, for example, such a system may comprise red, green, and blue transponders for adjusting the primary colors and white transponders to influence the color setting by adding white light.

An example of such a lighting device is characterized in that the detection device is incorporated in a bowl-like container, and the transponders are incorporated in tangible objects, a transponder being in its first position when it is outside the bowl-like container and in its second position when it is inside the bowl-like container.

In this example the transponders may be marbles which can be put on a bowl, and all the transponders in the bowl determine the color and intensity of the corresponding lighting unit. Such a bowl may be placed on a table, just like a bowl of fruits, and may be a decorative object in the interior of a household.

Another example is characterized in that the transponders are each provided with a switching element and are incorporated in tangible objects having at least a first side and a second side, the switch being off when the first side is up and the switch being on when the second side is up, a transponder being in its first position when the tangible object is positioned with its first side up in its second position when the tangible object is positioned with its second side up.

In this example the transponders are transferred from their first position to their second position by just turning them upside-down. This means that, in the case of the bowl-like container, all the transponders can be inside this bowl at all times, and whether the transponders are active or not is determined by the side which points up.

In the same way, the detection device may be incorporated in, for instance, the edge or surface of a table, thus providing a lighting device for which all the transponders are just objects lying on the table within the area of the detection device, and the lighting unit is controlled by turning the transponders upside-down (or not).

The lighting device is further characterized in that the lighting device further comprises a processing unit for converting the response signals from the detection device into an input value for the lighting unit.

Each transponder which is put in its second position sends a response signal that is to be translated into the information needed for driving the lighting unit. This translation can be easily performed by a processing unit such as, for example, a personal computer. By way of example, the translation may be derived from a look-up table giving the relation between a series of response signals from a number of transponders to the corresponding lighting colors and/or intensities of the lighting unit.

The invention further relates to a user interface for controlling a lighting unit of such a lighting device, to an assembly of a lighting unit and a processing unit controlled by such a user interface, as well as to a method of controlling this lighting unit.

These and other aspects of the invention will be apparent from and will be elucidated by way of non-limitative examples with reference to the drawings and the embodiments described hereinafter.

Figure 3:
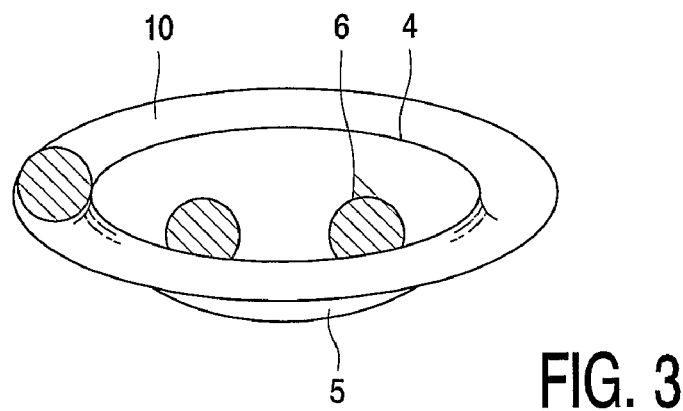
Figure 4:
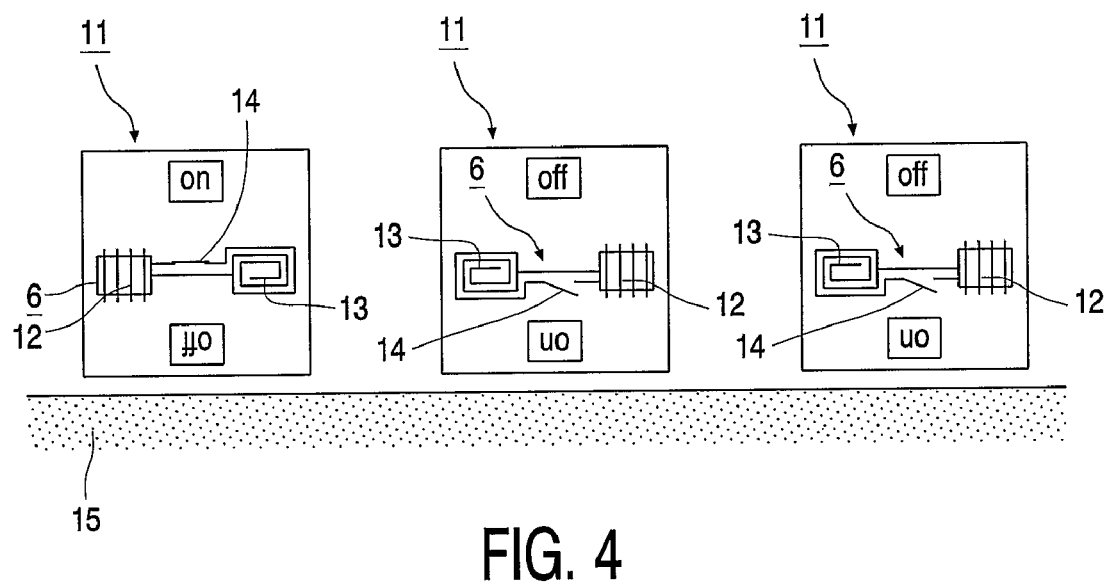
Figure 5:
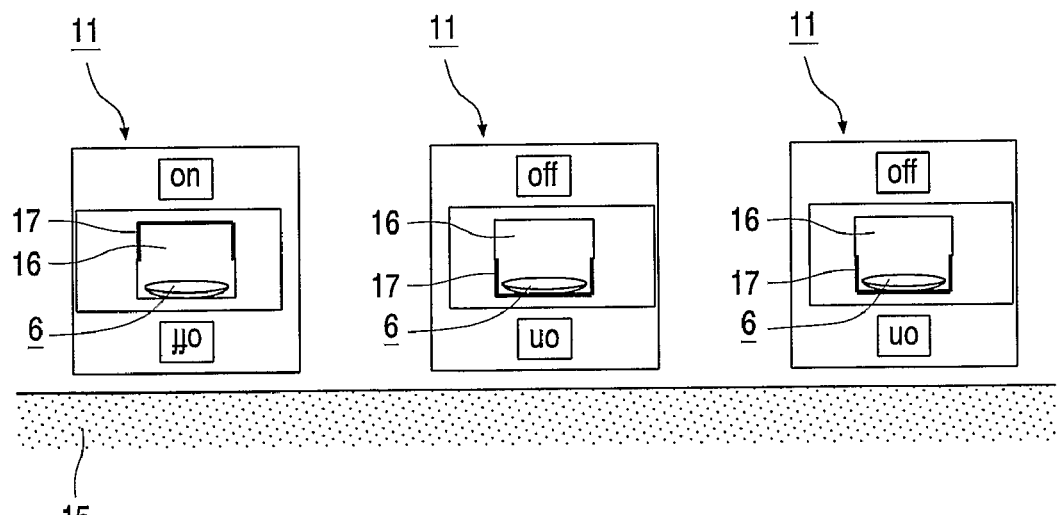

In the drawings:

FIG. 1 is a schematic drawing of the lighting device according to the invention;

FIGS. 2A-2E give a first embodiment according to the invention;

FIG. 3 is a variation on the first embodiment;

FIG. 4 gives a second embodiment according to the invention;

FIG. 5 is a variation on the second embodiment.

FIG. 1 gives a schematic overview of the different components of the lighting device 1 according to the present invention. The lighting device 1 comprises a lighting unit 2 and a user interface 3. In the user interface 3 the following elements can be distinguished: a detection device 4 such as, for example, an antenna, and the transponders 6. In this example the detection device 4 is mounted on a bowl 5. When the transponders 6 are positioned outside the bowl in this example, they are considered to be inactive, i.e. they are not detected by the detection device 4, whereas inside the bowl they are active, i.e. they are detected and the transponders send back a response signal. This response signal is converted into signals suitable for the driver circuit 8 to drive the light sources 7. This conversion from response signal to the choice of color and/or intensity of the lighting unit 2 is performed by a processing unit 9—for instance a personal computer—which may be a separate entity, but it may alternatively be integrated in the user interface 3 or in the lighting unit 2.

The user interface 3 can be seen as the remote control for the lighting in the room. The information derived from the response signal is sent to the processing unit 9, and the converted data is sent to the driver circuit 8. This transfer of information may be through physical interconnection of the separate units, but it may alternatively be done by wireless transmission of the information.

The light sources 7 may be LEDs of different colors or alternative light sources such as conventional lamps.

The present invention will now be described on the basis of two examples, but is not limited to these examples.

The user interface 3 of the first embodiment is shown in the FIGS. 2A-2E. This user interface 3 has a bowl-like container 5 and a number of transponders 6. The bowl-like container 5 may be a bowl, like a fruit-bowl which may have a decorative value on a table, but also any other shape suitable for containing the transponders 6. The bowl-like container 5 is provided with a detection device 4; this may be a coil or an antenna which is mounted on the edge of the bowl-like container 5. This detection device 4 has to be provided with a power supply and means for reading the information from the transponders 6. RFID tags—RFID stands for Radio Frequency Identification—may be chosen as the transponders 6. These RFID tags comprise an IC which can be programmed such that it contains an ID number. The detection device 4 comprises an antenna which sends an electromagnetic signal. This electromagnetic signal is received by the RFID tags, which use the energy from this signal for their power supply, and the RFID tags send back a response signal with the identification as programmed in said RFID tag.

This information is sent to the processing unit 9, in which it is converted into an input signal for the lighting unit 2. This processing unit 9 will translate this response signal into the appropriate parameters to drive a lighting device 2. If the lighting device 2 is a LED system, these parameters may be the currents required to have a certain light output of the LEDs, or in the case of a large number of LEDs, these parameters may determine which LEDs are on and which are off.

In FIG. 2A the lighting unit 2 is in the off state, all the transponders are outside the bowl-like container 5, which is referred to as their first or inactive position. In this example the transponders 6 are contained in a marble-shaped tangible object—also referred to as marbles below—which are colored so as to correspond to the contribution the marble makes to the desired color of the lighting. For instance, if the lighting unit comprises red, green, and blue LEDs, then the marbles are also red, green, and blue in color. In the FIGS. 2B and 2C the lighting unit will emit light of only one color corresponding to the transponder 6 which is in its active position.

Figure 2D:
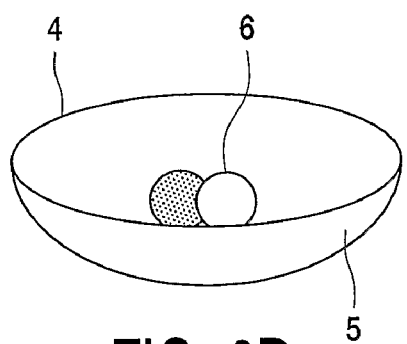
Figure 2E:
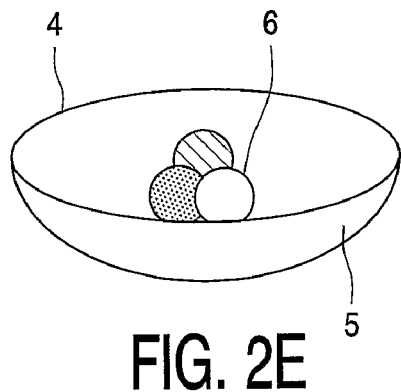

Adding more transponders 6 to the bowl-like container 5 will give rise to a mixing of colors as shown in FIGS. 2D and 2E. The intensity of the light can be controlled by adding more marbles of the same colors. It may be chosen to increase the power on the LEDs linearly with the number of marbles of the corresponding color which are active.

The sensitivity of the human eye shows a logarithmic behavior, i.e. the eye perceives the increase in intensity as linear if the power of the lighting sources is increased exponentially. For that reason, the processing unit 9 may be programmed such that adding marbles to the bowl-like container 5 causes the intensity to increase exponentially.

When the bowl-like container 5 comprises a number of marbles chosen to give the desired color of lighting, and the intensity has to be increased, then marbles have to be added in the same ratio as already present in the bowl-like container 5 in order to keep the color of the light the same. As a possible alternative for increasing the light intensity, use may be made of dedicated light-intensity marbles. For these marbles the processing unit 9 is programmed to increase the light intensity in dependence on the ratio of the already active marbles of different color. So, these dedicated light-intensity marbles do not change the lighting color.

The light intensity may also be controlled by means of marbles of different size: the larger the marble, the higher the light intensity.

Furthermore, it will be possible to use marbles with mixed colors, for instance a purple marble will drive a blue and a red LED simultaneously.

The marbles chosen to be inactive may be put in a separate box or just laid beside the bowl-like container. As an alternative, as shown in FIG. 3, a bowl-like container 5 may be used with a groove 10, located outside the region enclosed by the detection device 4, where the inactive marbles can be put.

FIG. 4 gives a second embodiment of the present invention. In this example the transponder 6 is incorporated in a cube 11 which is placed on a surface 15, for instance a table. The detection device 4 may be installed in the edge of the table top or in some region of the table top. Additionally, the transponders 6 are each provided with a switching element 14 for enabling the transponder 6 to change from inactive to active. For instance, this switching element 14 may be a gravity switch, which is open—the off or inactive position—when the cube is in its first position, and it is closed—the on or active position—when the cube is turned upside-down into its second position. In FIG. 4, the major parts of this type of transponder 6 can be distinguished inside the cube: the IC 12 with the programmed information, for instance the ID number, the antenna 13 for receiving and returning signals, and the switching element 14.

In this embodiment the cubes 11 may be colored so as to correspond to the color of the lighting to be controlled. In order to see what is the active and in-active position of the cube, the side pointing up when the cube is inactive may be provided with just an indication of the appropriate color, e.g. black with a colored dot, while the side pointing up when active is fully colored. In FIG. 4, the left cube 11 is active, whereas the center and right cubes 11 are inactive. The way in which the lighting color and intensity are controlled is similar to the first embodiment, the difference is found in the way the transponders are transferred from their first position to their second position: in the first embodiment by putting the marbles in the bowl-like container 4, in the second embodiment by turning the cubes 11 upside-down.

An alternative for the gravity switch is given in FIG. 5. Here the cube 11 is provided with a cavity 16. In this cavity 16 a transponder 6 is positioned which can move in this cavity 16. Furthermore, the cavity 16 is provided with a metal shielding 17 which covers half of the cavity. In the left cube in FIG. 5, the shielding 17 covers the upper half of the cavity 16 when the cube 11 is in its second—active—position; in this orientation of the cube 11 the transponder 6 will be detected by the detection device 4. When the cube 11 is turned upside-down, as has been done for the center and right cubes of FIG. 5, the shielding 17 will cover the lower half of the cavity, the transponder 6 will fall down, and the communication from the RFID tag will be cut off, so that the RFID tag will not be seen by the detection device 4, i.e. is inactive.

Here also, the use of cubes is not limiting this example, the tangible objects comprising the transponder 6 may have different shapes, for instance a flat disc or a cylinder.

Furthermore, the two embodiments may be combined, for instance if the transponder 6 is provided with a switching element 14, it can also be used in a bowl-like container 5. In that case, the transponders 6 remain in the bowl-like container 5 and are transferred from their first position to their second position by turning them upside-down. Preferably, the transponders are then disc- or a pebble-shaped.

Dividing the surface 15 into a number of sub-areas, each sub-area being provided with a detection device 4, renders it possible to use the surface 15 as a map of the room in which the lighting has to be controlled. The relative positions of the cubes 11 on the surface 15 determine which detection device 4 sees the presence of said cubes 11 and they can thus be used to indicate in which specific parts of the room the lighting is controlled.

Summarizing, the present invention relates to a lighting system 1 with a user interface 3 for controlling the lighting color and/or intensity of a lighting unit 2 determining the lighting conditions in a room. The user interface 3 is based on a system comprising a detection device 4 and transponders 6. Bringing the transponders 6 within the detection device 4 so that they will be detected causes the transponders 6 to send a response signal, which signal controls the lighting color and/or intensity of the lighting unit 2. Each transponder 6 is programmed to control a particular color or a specific light intensity.

The invention claimed is:

1. A lighting device, comprising a lighting unit and a user interface for controlling the color and/or intensity of light emitted by the lighting unit, said user interface comprising:
   a plurality of transponders; and
   a detection device for detecting transponders, each transponder controlling a particular color and/or intensity of the light and configured to assume a plurality of positions, including first position corresponding to a state in which said transponder is not detected by the detection device, and a second position corresponding to a state in which said transponder is detected by the detecting device and sends a response signal controlling the color and/or intensity of the light, wherein the detection device is incorporated in a container and the transponders are incorporated in tangible objects, wherein a transponder is in the first position when the transponder is outside the container, and wherein the transponder is in the second position when the transponder is inside the container.

2. A lighting device according to claim 1, wherein the particular lighting colors to be controlled comprise the primary colors red, green, and blue.

3. A lighting device according to claim 1, wherein the lighting unit comprises LEDs.

4. A lighting device according to claim 1, wherein the intensity of a particular color of the light is proportional to the number of transponders arranged to control said color and assuming the first and/or second position.

5. A lighting device according to claim 1, wherein the transponders are RFID tags, each comprising an identification number.

6. A lighting device according to claim 5, wherein the detection device comprises an antenna arranged to send, in operation, an electromagnetic signal to be received by the RFID tag, the response signal comprising the identification number of the RFID tag.

7. A lighting device according to claim 1, wherein the detection device is incorporated in the container having a bowl-like shape.

8. A lighting device according to claim 7, wherein each tangible object has a color corresponding to the lighting color it is arranged to control.

9. A lighting device according to claim 7, wherein the tangible objects have the shape of marbles.

10. A lighting device according claim 1, further comprising a processing unit for converting the response signals from the detection device into input values for the lighting unit.

11. A lighting device comprising a lighting unit and a user interface for controlling the color and/or intensity of light emitted by the lighting unit, said user interface comprising:
   a plurality of transponders; and
   a detection device for detecting transponders, each transponder controlling a particular color and/or intensity of the light and configured to assume a plurality of positions including a first position corresponding to a state in which said transponder is not detected by the detection device, and a second position corresponding to a state in which said transponder is detected by the detecting device and sends a response signal, said response signal controlling the color and/or intensity of the light emitted by the lighting unit, wherein the transponders are each provided with a switching element and are incorporated in tangible objects having at least a first side and a second side, the switch being off when the first side is up and the switch being on when the second side is up, a transponder being in its first position when the tangible object is positioned with its first side up and it is in its second position when the tangible object is positioned with its second side up.

12. A lighting device according to claim 11, wherein the second side of each tangible object is colored so as to correspond to the lighting color it controls, and the first side of each tangible object bears an indication of said color.

13. A lighting device according to claim 11, wherein the detection device is incorporated in a bowl-like container (5) and the transponders having the shape of disc-like tangible objects are positioned in said bowl-like container.

14. A lighting device according to claim 11, wherein the detection device comprises at least a portion of a surface, and wherein the transponders are tangible objects having a cube-like shape positioned on said surface.

15. A lighting device, according claim 11, further comprising a processing unit for converting the response signals from the detection device into input values for the lighting unit.

16. A user interface for controlling a lighting unit, comprising:
   a transponder; and
   a detection device (4), wherein the transponder is arranged to control a particular color and/or intensity of light emitted by the lighting unit and to assume a first position corresponding to a state in which said transponder is not detected by the detecting device and a second position corresponding to a state in which said transponder is detected by the detection device and sends a response signal, said response signal controlling the lighting color and/or intensity of the lighting unit,
   wherein the transponder is incorporated in a tangible object having at least a first side and a second side, the transponder is in the first position when the tangible object is positioned with the first side up, and the transponder is in the second position when the tangible object is positioned with the second side up.

17. An assembly of a lighting unit and a processing unit, wherein said processing unit is arranged to receive a response signal delivered by the user interface of claim 16 and to convert this response signal into an input value for the lighting unit.

* * * * *